(12) United States Patent
Koshino

(10) Patent No.: US 12,507,979 B2
(45) Date of Patent: Dec. 30, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Riko Koshino, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 18/467,865

(22) Filed: Sep. 15, 2023

(65) Prior Publication Data

US 2024/0000418 A1 Jan. 4, 2024

Related U.S. Application Data

(63) Continuation of application No. PCT/JP2022/002190, filed on Jan. 21, 2022.

(30) Foreign Application Priority Data

Mar. 17, 2021 (JP) ................................. 2021-043469

(51) Int. Cl.
  *A61B 8/08* (2006.01)
  *A61B 8/00* (2006.01)
(52) U.S. Cl.
  CPC .......... *A61B 8/0825* (2013.01); *A61B 8/4254* (2013.01); *A61B 8/463* (2013.01); *A61B 8/58* (2013.01)
(58) Field of Classification Search
  CPC ..... A61B 8/0825; A61B 8/4254; A61B 8/463; A61B 8/58
  See application file for complete search history.

(56) References Cited

U.S. PATENT DOCUMENTS 6,540,681 B1 * 4/2003 Cheng ................. G01S 7/52065
                                                                600/443
2011/0208052 A1   8/2011 Entrekin
(Continued)

FOREIGN PATENT DOCUMENTS

CN         110786887 A    2/2020
JP         S56-151027 A   11/1981
(Continued)

OTHER PUBLICATIONS

The extended European search report issued by the European Patent Office on Jun. 27, 2024, which corresponds to European Patent Application No. 22770857.5.
(Continued)

*Primary Examiner* — Brooke Lyn Klein
(74) *Attorney, Agent, or Firm* — Studebaker Brackett PLLC

(57) ABSTRACT

An ultrasound diagnostic apparatus and a control method of an ultrasound diagnostic apparatus that enable a user to clearly check whether or not a breast of a subject is sufficiently scanned are provided. An ultrasound diagnostic apparatus 1 includes a sensor 4 that detects an inclined angle or a height position of an ultrasound probe 2, an image generation unit 13 that generates an ultrasound image from a reception signal obtained by scanning, a scanning detection unit that detects a start point and an end point of scanning of a breast of a subject from an inclined angle or a height position of the ultrasound probe 2, a graph generation unit 17 that generates a graph of a change in the inclined angle or the height position detected from the start point to the end point and that displays the graph on a monitor 15, and a display image selection unit 19 that, in a case where at least one of a designation point on the graph corresponding to the start point or a designation point on the graph corresponding to the end point is designated by a user,
(Continued)

displays an ultrasound image of an imaging position corresponding to the designation point on the monitor.

10 Claims, 9 Drawing Sheets

(56) References Cited

U.S. PATENT DOCUMENTS

| | | |
|---|---|---|
| 2013/0225986 A1 | 8/2013 | Eggers et al. |
| 2018/0310909 A1 | 11/2018 | Naganawa et al. |
| 2020/0337673 A1* | 10/2020 | Meral .................. A61B 8/00 |
| 2020/0367860 A1* | 11/2020 | Rouet ................ A61B 8/483 |
| 2021/0068782 A1* | 3/2021 | Caluser .............. A61B 8/4245 |
| 2021/0068783 A1 | 3/2021 | Caluser et al. |

FOREIGN PATENT DOCUMENTS

| | | |
|---|---|---|
| JP | H10-137242 A | 5/1998 |
| JP | 2008-086742 A | 4/2008 |
| JP | 2015-112410 A | 6/2015 |
| JP | 2017-159027 A | 9/2017 |
| JP | 2018-183448 A | 11/2018 |

OTHER PUBLICATIONS

International Search Report issued in PCT/JP2022/002190; mailed Apr. 19, 2022.

International Preliminary Report on Patentability (Chapter I) and Written Opinion of the International Searching Authority issued in PCT/JP2022/002190; issued Sep. 12, 2023.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2022/002190 filed on Jan. 21, 2022, which claims priority under 35 U.S.C. § 119(a) to Japanese Patent Application No. 2021-043469 filed on Mar. 17, 2021. The above applications are hereby expressly incorporated by reference, in their entirety, into the present application.

BACKGROUND OF THE INVENTION

1. Field of the Invention

The present invention relates to an ultrasound diagnostic apparatus and a control method of an ultrasound diagnostic apparatus used for examining a breast of a subject.

2. Description of the Related Art

In the related art, an ultrasound diagnostic apparatus that obtains a tomographic image inside a subject by scanning a body surface of the subject with an ultrasound probe has been known. A technology disclosed in JP2018-183448A that enables a user to securely examine the subject in examining the subject using the ultrasound diagnostic apparatus has been developed. JP2018-183448A discloses a technology for acquiring information related to a posture of the ultrasound probe via a sensor and for determining whether an imaged part of the subject is present on the left or the right of the subject based on the acquired information related to the posture of the ultrasound probe.

SUMMARY OF THE INVENTION

In a case where a breast of the subject is examined using the ultrasound diagnostic apparatus, the user may, for example, overlook a scanning range and not be able to sufficiently scan the entire breast because of a size or the like of the breast of the subject. In the technology of JP2018-183448A, while whether the breast scanned with the ultrasound probe is a left or right breast of the subject can be determined, it is difficult to clearly check whether or not the user has sufficiently scanned the breast.

The present invention has been conceived to eliminate the problem of the related art, and an object thereof is to provide an ultrasound diagnostic apparatus and a control method of an ultrasound diagnostic apparatus that enable a user to sufficiently scan a breast of a subject.

In order to achieve the object, an ultrasound diagnostic apparatus according to an aspect of the present invention comprises a monitor, an ultrasound probe, a sensor that detects an inclined angle or a height position of the ultrasound probe, an image generation unit that generates an ultrasound image based on a reception signal obtained by scanning a breast of a subject using the ultrasound probe, a scanning detection unit that detects a start point and an end point of scanning of the breast of the subject with the ultrasound probe along one direction based on the inclined angle or the height position of the ultrasound probe detected by the sensor, a graph generation unit that generates a graph representing a change in the inclined angle or the height position of the ultrasound probe detected by the sensor between the start point and the end point of scanning with the ultrasound probe detected by the scanning detection unit and that displays the graph on the monitor, and a display image selection unit that, in a case where at least one of a designation point on the graph corresponding to the start point or a designation point on the graph corresponding to the end point is designated by a user, displays an ultrasound image generated by the image generation unit based on a reception signal obtained at an imaging position corresponding to the designation point designated by the user, on the monitor.

In a case where an arbitrary designation point on the graph generated by the graph generation unit is designated by the user, the display image selection unit may display an ultrasound image generated by the image generation unit based on a reception signal obtained at an imaging position corresponding to the arbitrary designation point designated by the user, on the monitor.

In addition, in a case where an arbitrary designation point on the graph generated by the graph generation unit is designated by the user, the display image selection unit may display ultrasound images having a plurality of frames generated by the image generation unit based on reception signals obtained at a plurality of imaging positions corresponding to a determined range on the graph including the arbitrary designation point designated by the user, on the monitor as a video.

The ultrasound diagnostic apparatus may further comprise a scanning completion determination unit that determines whether scanning with the ultrasound probe complying with a determined scanning pattern is completed or not completed based on a shape of the graph generated by the graph generation unit, and a notification unit that notifies the user in a case where the scanning completion determination unit determines that scanning with the ultrasound probe is not completed.

In this case, the ultrasound diagnostic apparatus may further comprise a graph memory that stores a graph template representing a typical change in the inclined angle or the height position of the ultrasound probe in the determined scanning pattern, in which the scanning completion determination unit determines whether scanning complying with the determined scanning pattern is completed or not completed by comparing the graph generated by the graph generation unit with the graph template stored in the graph memory.

The graph memory may store a plurality of the graph templates related to the height position of the ultrasound probe corresponding to a plurality of the determined scanning patterns, and the scanning completion determination unit may determine whether scanning complying with a scanning pattern designated by the user is completed or not completed using a graph template corresponding to the scanning pattern designated by the user among the plurality of determined scanning patterns.

In addition, the graph memory may store a plurality of the graph templates related to the inclined angle of the ultrasound probe corresponding to a plurality of the determined scanning patterns, and the scanning completion determination unit may determine whether scanning complying with a scanning pattern designated by the user is completed or not completed using a graph template corresponding to the scanning pattern designated by the user among the plurality of determined scanning patterns.

In addition, the graph generation unit may display at least one point corresponding to the imaging position at which the reception signal for generating the ultrasound image via the image generation unit is obtained in the generated graph, on the monitor in a highlighted manner.

In addition, the ultrasound diagnostic apparatus may further comprise a scanning combining unit that, in a case where scanning with the ultrasound probe is interrupted based on an instruction of the user and where scanning with the ultrasound probe is resumed based on an instruction of the user, combines the interrupted scanning and the resumed scanning into one scanning.

A control method of an ultrasound diagnostic apparatus according to another aspect of the present invention comprises detecting an inclined angle or a height position of an ultrasound probe via a sensor, generating an ultrasound image based on a reception signal obtained by scanning a breast of a subject using the ultrasound probe, detecting a start point and an end point of scanning of the breast of the subject with the ultrasound probe along one direction based on the inclined angle or the height position of the ultrasound probe detected by the sensor, generating a graph representing a change in the inclined angle or the height position of the ultrasound probe detected between the start point and the end point of scanning with the ultrasound probe and displaying the graph on a monitor, and displaying, in a case where at least one of a designation point on the graph corresponding to the start point or a designation point on the graph corresponding to the end point is designated by a user, an ultrasound image generated based on a reception signal obtained at an imaging position corresponding to the designation point designated by the user, on the monitor.

In the control method of the ultrasound diagnostic apparatus, in a case where an arbitrary designation point on the generated graph is designated by the user, an ultrasound image generated based on a reception signal obtained at an imaging position corresponding to the arbitrary designation point designated by the user may be displayed on the monitor.

In this case, in a case where an arbitrary designation point on the generated graph is designated by the user, ultrasound images having a plurality of frames generated based on reception signals obtained at a plurality of imaging positions corresponding to a determined range on the graph including the arbitrary designation point designated by the user may be displayed on the monitor as a video.

In the control method of the ultrasound diagnostic apparatus, whether scanning with the ultrasound probe complying with a determined scanning pattern is completed or not completed may be determined based on a shape of the generated graph.

In this case, a graph template representing a typical change in the height position or the inclined angle of the ultrasound probe in the determined scanning pattern may be stored, and whether scanning complying with the determined scanning pattern is completed or not completed may be determined by comparing the generated graph with the graph template.

In addition, in the control method of the ultrasound diagnostic apparatus, a plurality of the graph templates related to the height position of the ultrasound probe corresponding to a plurality of the determined scanning patterns may be stored, and whether scanning complying with a scanning pattern designated by the user is completed or not completed may be determined using a graph template corresponding to the scanning pattern designated by the user among the plurality of determined scanning patterns.

In addition, a plurality of the graph templates related to the inclined angle of the ultrasound probe corresponding to a plurality of the determined scanning patterns may be stored, and whether scanning complying with a scanning pattern designated by the user is completed or not completed may be determined using a graph template corresponding to the scanning pattern designated by the user among the plurality of determined scanning patterns.

In addition, at least one point corresponding to the imaging position at which the reception signal for generating the ultrasound image is obtained in the generated graph may be displayed on the monitor in a highlighted manner.

In addition, in the control method of the ultrasound diagnostic apparatus, in a case where scanning with the ultrasound probe is interrupted based on an instruction of the user and where scanning with the ultrasound probe is resumed based on an instruction of the user, the interrupted scanning and the resumed scanning may be combined into one scanning.

According to the present invention, an ultrasound diagnostic apparatus comprises a sensor that detects an inclined angle or a height position of an ultrasound probe, an image generation unit that generates an ultrasound image based on a reception signal obtained by scanning a breast of a subject using the ultrasound probe, a scanning detection unit that detects a start point and an end point of scanning of the breast of the subject with the ultrasound probe along one direction based on the inclined angle or the height position of the ultrasound probe detected by the sensor, a graph generation unit that generates a graph representing a change in the inclined angle or the height position of the ultrasound probe detected by the sensor between the start point and the end point of scanning with the ultrasound probe detected by the scanning detection unit and that displays the graph on a monitor, and a display image selection unit that, in a case where at least one of a designation point on the graph corresponding to the start point or a designation point on the graph corresponding to the end point is designated by a user, displays an ultrasound image generated by the image generation unit based on a reception signal obtained at an imaging position corresponding to the designation point designated by the user, on the monitor. Thus, the user can clearly check whether or not the breast of the subject is sufficiently scanned.

DESCRIPTION OF THE PREFERRED EMBODIMENTS

Hereinafter, embodiments of the invention will be described with reference to the accompanying drawings.

The description of configuration requirements described below is provided based on the representative embodiment of the present invention, but the present invention is not limited to such an embodiment.

In the present specification, a numerical range represented using "to" means a range including the numerical values before and after "to" as a lower limit value and an upper limit value.

In the present specification, the terms "identical" and "same" include an error range generally allowed in the technical field.

Embodiment 1

Figure 1:
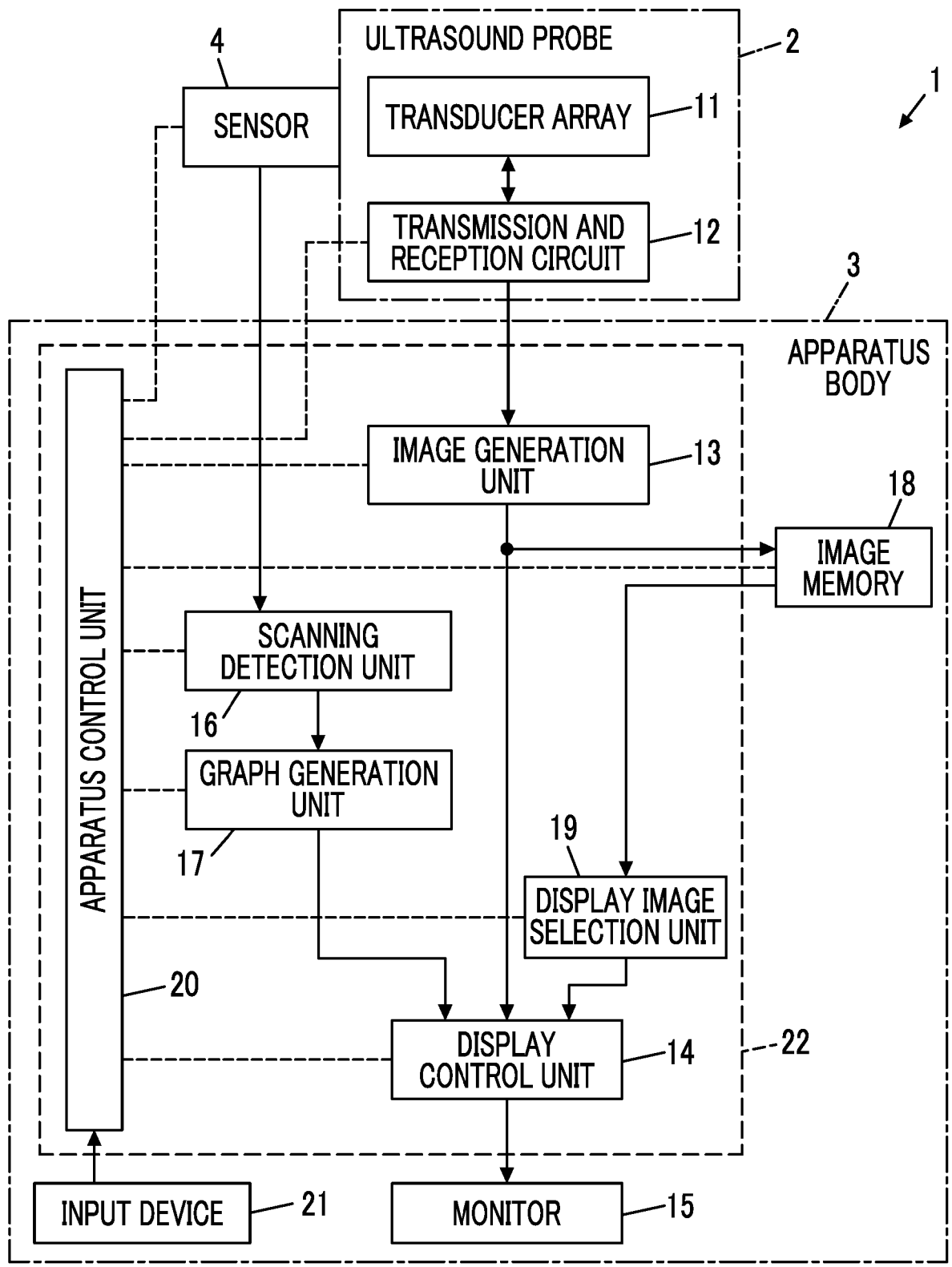
FIG. 1 is a block diagram illustrating a configuration of an ultrasound diagnostic apparatus according to Embodiment 1 of the present invention.

FIG. 1 illustrates a configuration of an ultrasound diagnostic apparatus 1 according to an embodiment of the present invention. The ultrasound diagnostic apparatus 1 comprises an ultrasound probe 2 and an apparatus body 3 connected to the ultrasound probe 2. In addition, a sensor 4 is attached to the ultrasound probe 2.

The ultrasound probe 2 comprises a transducer array 11. A transmission and reception circuit 12 is connected to the transducer array 11.

The apparatus body 3 comprises an image generation unit 13. The image generation unit 13 is connected to the transmission and reception circuit 12 of the ultrasound probe 2. In addition, a display control unit 14 and a monitor 15 are sequentially connected to the image generation unit 13. In addition, the apparatus body 3 comprises a scanning detection unit 16 connected to the sensor 4. In addition, a graph generation unit 17 is connected to the scanning detection unit 16, and the display control unit 14 is connected to the graph generation unit 17. In addition, an image memory 18 is connected to the image generation unit 13. A display image selection unit 19 is connected to the image memory 18, and the display control unit 14 is connected to the display image selection unit 19.

In addition, an apparatus control unit 20 is connected to the sensor 4, the transmission and reception circuit 12, the image generation unit 13, the display control unit 14, the scanning detection unit 16, the graph generation unit 17, the image memory 18, and the display image selection unit 19. Furthermore, an input device 21 is connected to the apparatus control unit 20.

In addition, a processor 22 for the ultrasound diagnostic apparatus 1 is composed of the image generation unit 13, the display control unit 14, the scanning detection unit 16, the graph generation unit 17, the display image selection unit 19, and the apparatus control unit 20.

The transducer array 11 of the ultrasound probe 2 includes a plurality of one-dimensionally or two-dimensionally arranged ultrasound oscillators. Each of these ultrasound oscillators transmits an ultrasound wave in accordance with a drive signal supplied from the transmission and reception circuit 12 and receives an ultrasound echo from a subject to output a signal based on the ultrasound echo. Each ultrasound oscillator is configured by forming electrodes at both ends of a piezoelectric body consisting of, for example, a piezoelectric ceramic represented by lead zirconate titanate (PZT), a polymer piezoelectric element represented by polyvinylidene difluoride (PVDF), and a piezoelectric single crystal represented by lead magnesium niobate-lead titanate (PMN-PT).

Figure 2:
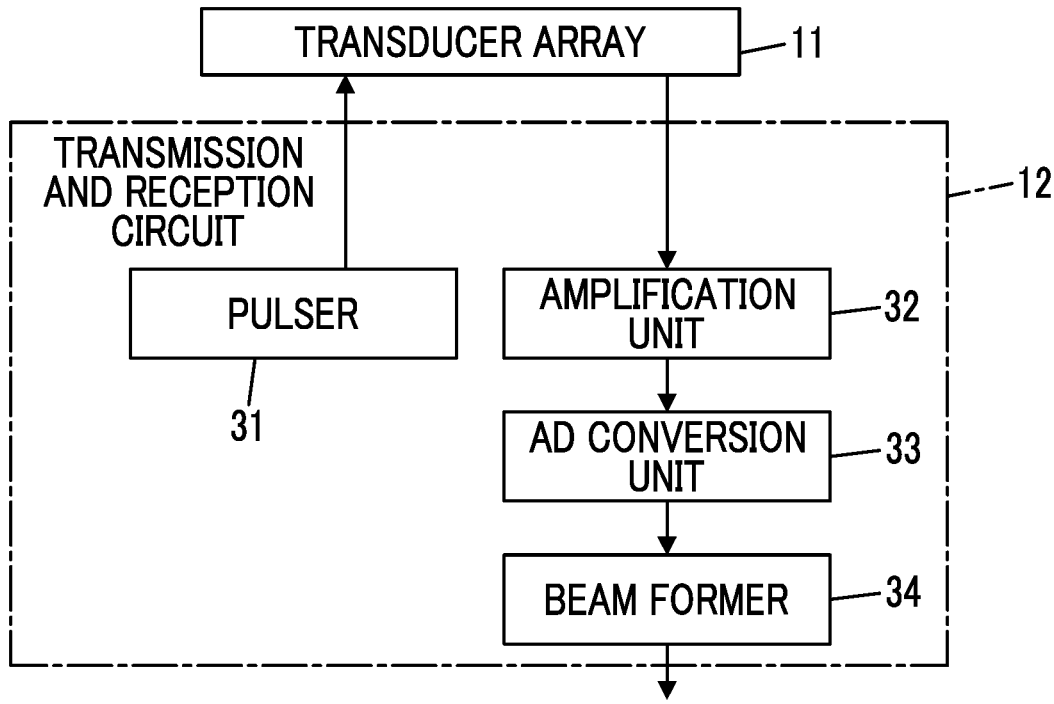
FIG. 2 is a block diagram illustrating a configuration of a transmission and reception circuit in Embodiment 1 of the present invention.

The transmission and reception circuit 12 transmits the ultrasound waves from the transducer array 11 and generates a sound ray signal based on reception signals acquired by the transducer array 11 under control of the apparatus control unit 20. As illustrated in FIG. 2, the transmission and reception circuit 12 includes a pulser 31 connected to the transducer array 11 and an amplification unit 32, an analog digital (AD) conversion unit 33, and a beam former 34 sequentially connected in series from the transducer array 11.

The pulser 31 includes, for example, a plurality of pulse generators, adjusts a delay amount of each drive signal based on a transmission delay pattern selected in accordance with a control signal from the apparatus control unit 20 so that the ultrasound waves transmitted from the plurality of ultrasound oscillators of the transducer array 11 form an ultrasound beam, and supplies each drive signal to the plurality of ultrasound oscillators. In a case where a voltage having a pulse shape or a continuous wave shape is applied to the electrodes of the ultrasound oscillators of the transducer array 11, the piezoelectric bodies expand and contract to generate ultrasound waves having a pulse shape or a continuous wave shape from each ultrasound oscillator, and the ultrasound beam is formed from a combined wave of the ultrasound waves.

The transmitted ultrasound beam is reflected by, for example, a target such as a part of the subject and propagates toward the transducer array 11 of the ultrasound probe 2. The ultrasound echo propagating toward the transducer array 11 is received by each ultrasound oscillator constituting the transducer array 11. In this case, each ultrasound oscillator constituting the transducer array 11 receives the propagating ultrasound echo, expands and contracts to generate the reception signal that is an electric signal, and outputs the reception signal to the amplification unit 32.

The amplification unit 32 amplifies the signals input from each ultrasound oscillator constituting the transducer array 11 and transmits the amplified signals to the AD conversion unit 33. The AD conversion unit 33 converts the signals transmitted from the amplification unit 32 into digital reception data. The beam former 34 performs so-called reception focus processing of applying a delay to each reception data received from the AD conversion unit 33 and of adding each reception data together. By performing the reception focus processing, the sound ray signal in which each reception data converted by the AD conversion unit 33 is phased and added together and in which a focus of the ultrasound echo is narrowed is acquired.

Figure 3:
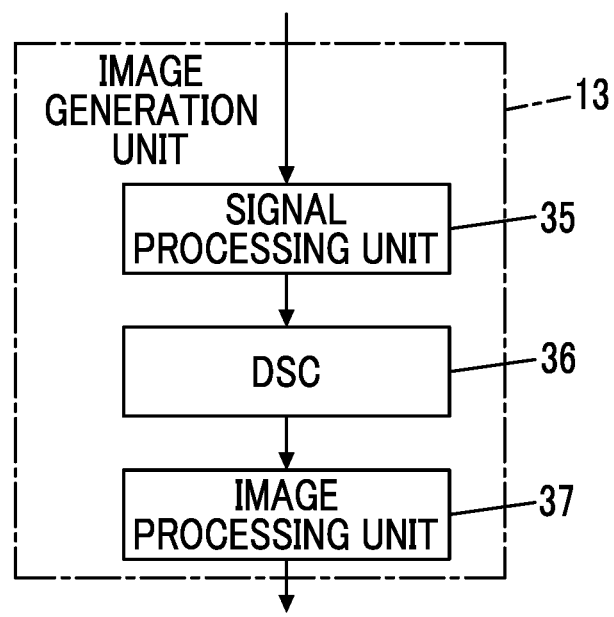
FIG. 3 is a block diagram illustrating a configuration of an image generation unit in Embodiment 1 of the present invention.

The image generation unit 13 has a configuration in which a signal processing unit 35, a digital scan converter (DSC) 36, and an image processing unit 37 are sequentially connected in series as illustrated in FIG. 3.

The signal processing unit 35 corrects attenuation by distance of the sound ray signal received from the transmission and reception circuit 12 in accordance with depths of reflection positions of the ultrasound waves using a sound speed value set by the apparatus control unit and then performs envelope detection processing on the sound ray signal to generate a B-mode image signal that is tomographic image information related to tissues inside the subject.

The DSC 36 converts the B-mode image signal generated by the signal processing unit into an image signal complying with a scanning method of a typical television signal (raster conversion).

The image processing unit 37 performs various types of necessary image processing such as gradation processing on the B-mode image signal input from the DSC 36 and then transmits the B-mode image signal to the display control unit 14 and to the image memory 18. Hereinafter, the B-mode image signal on which the image processing is performed by the image processing unit 37 will be referred to as an ultrasound image.

The apparatus control unit 20 controls each part of the ultrasound probe 2, each part of the apparatus body 3, and the sensor 4 in accordance with a program and the like recorded in advance.

The display control unit 14 performs predetermined processing on the ultrasound image or the like generated by the image generation unit 13 and displays the ultrasound image or the like on the monitor 15 under the control of the apparatus control unit 20.

The monitor 15 performs various types of display under control of the display control unit 14. Examples of the monitor 15 include display devices such as a liquid crystal display (LCD) and an organic electroluminescence display (organic EL display).

The input device 21 is used for a user to perform an input operation. For example, the input device 21 is composed of a device used for the user to perform the input operation, such as a keyboard, a mouse, a trackball, a touchpad, and a touch panel.

The sensor 4 is used for detecting a height position or an inclined angle of the ultrasound probe 2. For example, an acceleration sensor or a gyro sensor may be used as the sensor 4.

Here, the height position of the ultrasound probe 2 is a height position of a tip part of the ultrasound probe 2 in contact with a body surface of the subject. For example, the sensor 4 can detect a value of a relative height position with reference to an arbitrary height in a case where the user moves the ultrasound probe 2. For example, the arbitrary height can be a height of a start point of scanning with the ultrasound probe 2.

In addition, the inclined angle of the ultrasound probe 2 is an inclined angle in a case where the ultrasound probe 2 is inclined in a plane orthogonal to a scan surface using the tip part of the ultrasound probe 2 as a fulcrum. For example, the inclined angle in a state where the tip part of the ultrasound probe 2 is vertically downward can be set to zero. The sensor 4 can detect a positive value of the inclined angle in a case where inclination is performed to one side, and detect a negative value of the inclined angle in a case where inclination is performed to the other side.

While the ultrasound probe 2 is moved on the breast of the subject by the user along one direction in a front view of the subject, the scanning detection unit 16 detects a start point and an end point of scanning of the breast of the subject with the ultrasound probe 2 along one direction based on the height position or the inclined angle of the ultrasound probe 2 detected by the sensor 4.

Here, scanning of the breast of the subject with the ultrasound probe 2 along one direction means performing scanning in accordance with a determined scanning pattern on the breast of the subject while the user moves the ultrasound probe 2 along one direction in a front view of the subject in a state where the tip part of the ultrasound probe 2 is in contact with the body surface of the breast of the subject.

Figure 4:
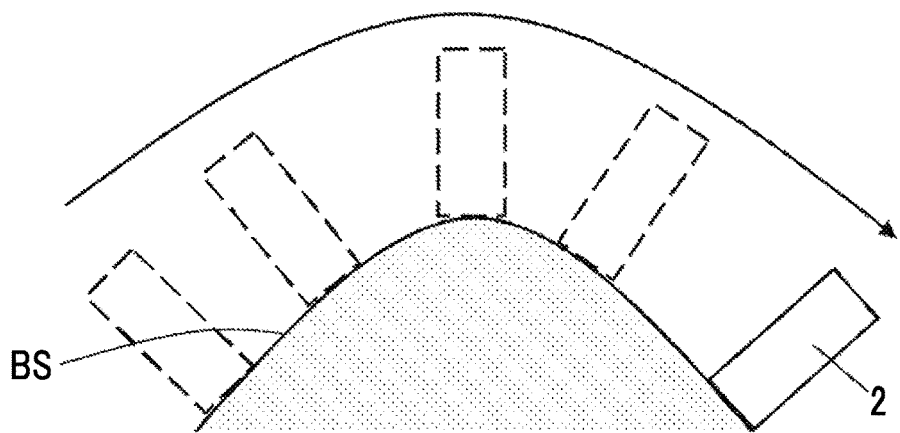
FIG. 4 is a diagram schematically illustrating an ultrasound probe moved on a breast of a subject in Embodiment 1 of the present invention.

For example, the determined scanning pattern refers to a method of scanning the breast of the subject while moving the ultrasound probe 2 along one direction in a front view of the subject, such as a scanning method of scanning from one end part to the other end part of the breast of the subject along one direction in a front view of the subject or a scanning method of scanning from a nipple to a peripheral part of the breast of the subject along one direction in a front view of the subject. In FIG. 4, an example in which the ultrasound probe 2 moves on a body surface BS of the subject to scan a range from one end part to the other end part of the breast of the subject is illustrated as the determined scanning pattern.

Scanning from one end part to the other end part of the breast of the subject means scanning from one end part of the peripheral part of the breast of the subject to the other end part of the peripheral part of the breast while moving the ultrasound probe 2 along one direction. Here, moving the ultrasound probe 2 along one direction means that a movement direction of the ultrasound probe is constant. In addition, for example, the scanning method of scanning from one end part to the other end part of the breast of the subject includes a case of setting end parts of one breast in an up-down direction as one end part and the other end part or a case of setting end parts of one breast in a left-right direction as one end part and the other end part in a front view of the subject. In addition, for example, the scanning method of scanning from the nipple to the peripheral part includes a case of radially scanning from the nipple toward the peripheral part or a case of scanning by drawing a circle around the nipple in one direction using the nipple as a center.

Normally, the ultrasound probe 2 is generally moved at an almost constant speed during scanning of the breast of the subject. However, at the start of scanning, it is general to start moving from a standstill state or to start moving the ultrasound probe 2 that has been moving in a constant direction to a different direction. In addition, at the end of scanning, it is general to bring the ultrasound probe 2 to a standstill from a moving state or to start moving the ultrasound probe 2 that has been moving in a constant direction to a different direction. Accordingly, a value that significantly deviates from an originally detected value is generally obtained immediately before the start of scanning or immediately after the end of scanning.

Thus, for example, the scanning detection unit 16 can detect the start point of scanning with the ultrasound probe 2 based on a change in the detection value obtained by the sensor 4 after an elapse of a constant time from immediately before the start of scanning, such that the scanning detection unit 16 detects an imaging position immediately after a rapid change in the output value of the sensor 4 as the start point of scanning with the ultrasound probe 2. In addition, for example, the scanning detection unit 16 can detect the end point of scanning with the ultrasound probe 2 based on a change in the detection value obtained by the sensor 4 within a constant time from before the end of scanning to immediately after the end of scanning, such that the scanning detection unit 16 detects the imaging position immediately before a rapid change in the output value of the sensor 4 as the end point of scanning with the ultrasound probe 2.

The graph generation unit 17 generates a graph representing a change in time of the height position or the inclined angle of the ultrasound probe 2 detected by the sensor 4 between the start point and the end point of scanning with the ultrasound probe 2 detected by the scanning detection unit 16 and displays the generated graph on the monitor 15.

Figure 5:
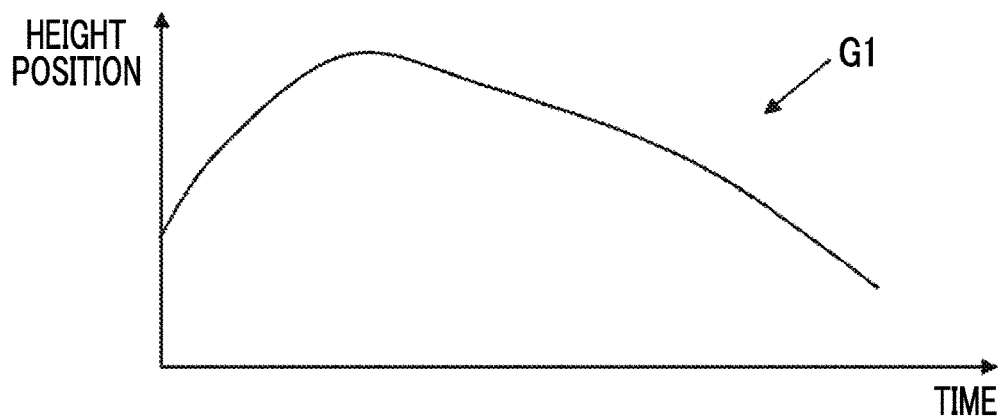
FIG. 5 is an example of a graph showing a change in time of a height position of the ultrasound probe detected in Embodiment 1 of the present invention.

FIG. 5 illustrates an example of a graph G1 representing a change in time of the height position of the ultrasound probe 2 detected by the sensor 4 in a case of scanning from one end part to the other end part of the breast of the subject with the ultrasound probe 2. As time passes from a time point of zero, that is, a left end part of the graph G1 corresponding to the start point of scanning, the height position is gradually increased. The graph G1 has the maximum at a point corresponding to the nipple. Then, the height position is gradually decreased to a right end part of the graph G1 corresponding to the end point of scanning.

Figure 6:
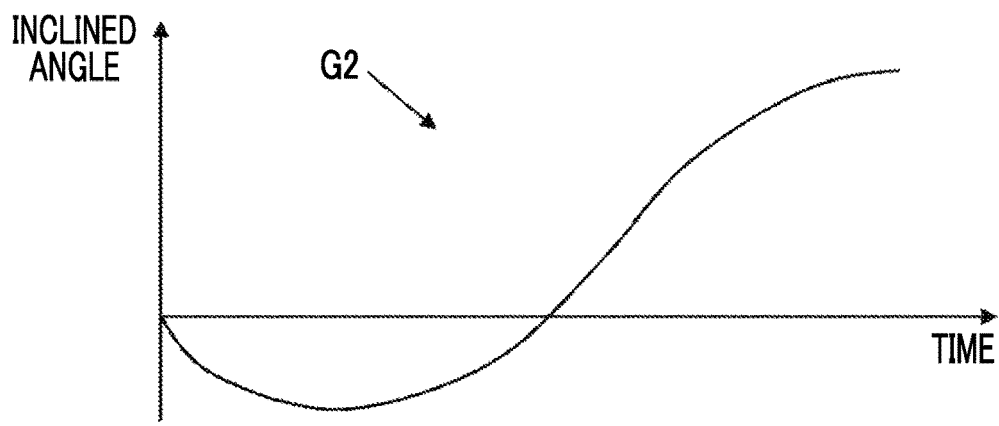
FIG. 6 is another example of a graph showing a change in time of an inclined angle of the ultrasound probe detected in Embodiment 1 of the present invention.

In addition, FIG. 6 illustrates an example of a graph G2 representing a change in time of the inclined angle of the ultrasound probe 2 detected by the sensor 4 in a case of scanning from one end part to the other end part of the breast of the subject with the ultrasound probe 2. In the graph G2, the inclined angle in a state where the tip part of the ultrasound probe 2 is vertically downward is set to zero. As time passes from a time point of zero, that is, a left end part of the graph G2 corresponding to the time point of the start point of scanning, the value of the inclined angle is increased in a negative direction and then is increased in a positive direction in the middle. The inclined angle reaches zero at a point corresponding to the nipple, and the value of the inclined angle is further increased in a positive direction.

Figure 7:
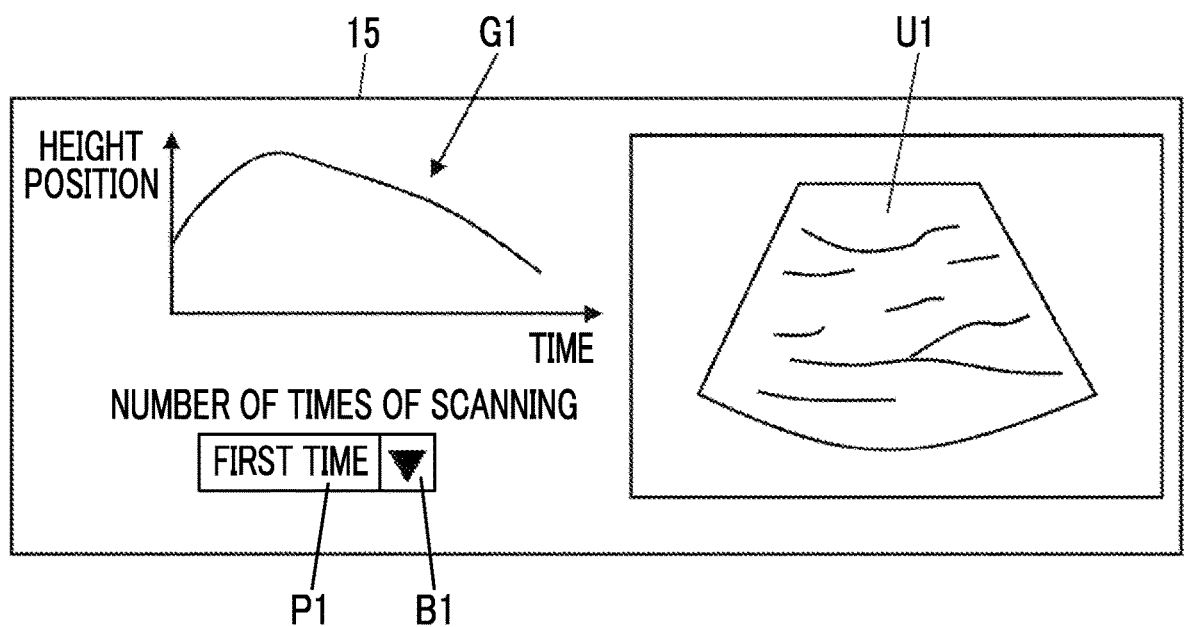
FIG. 7 is a diagram illustrating a display example of a graph and an ultrasound image in Embodiment 1 of the present invention.

In addition, for example, the graph generation unit 17 may display the graph G1 on the monitor 15 as illustrated in FIG. 7. In this case, the graph generation unit 17 may display, on the monitor 15, a scanning number-of-times display panel P1 showing the number of times that scanning is performed to generate the graph G1. The scanning number-of-times display panel P1 has a scanning number-of-times selection button B1. In a case where the scanning number-of-times selection button B1 is designated through the input device 21, a list of numbers of times that scanning has already been performed is displayed, and the user can select a desired number of times from the list. For example, in a case where the user selects "first time" from the list, the graph G1 generated in scanning performed for the first time is displayed on the monitor 15.

The image memory 18 is a memory that stores at least an ultrasound image generated from the reception signals obtained in the ultrasound probe 2 at the start point of scanning detected by the scanning detection unit 16 or an ultrasound image generated from the reception signals obtained in the ultrasound probe 2 at the end point of scanning detected by the scanning detection unit 16 among ultrasound images sequentially generated by the image generation unit 13.

For example, recording media such as a flash memory, a hard disk drive (HDD), a solid state drive (SSD), a flexible disk (FD), a magneto-optical disc (MO disc), a magnetic tape (MT), a random access memory (RAM), a compact disc (CD), a digital versatile disc (DVD), a secure digital card (SD card), and a universal serial bus memory (USB memory) can be used as the image memory 18.

In a case where at least one of a designation point on the graph G1 corresponding to the start point of scanning or a designation point on the graph G1 corresponding to the end point of scanning is designated by the user, the display image selection unit 19 displays the ultrasound image generated by the image generation unit 13 based on the reception signals obtained at the imaging position corresponding to the designation point designated by the user, on the monitor 15.

Hereinafter, for simplification of description, the ultrasound image generated by the image generation unit 13 based on the reception signals obtained at the start point of scanning will be referred to as the ultrasound image corresponding to the start point of scanning. The ultrasound image generated by the image generation unit 13 based on the reception signals obtained at the end point of scanning will be referred to as the ultrasound image corresponding to the end point of scanning.

Here, for example, as illustrated in FIG. 7, in a case where the graph G1 is displayed on the monitor 15 by the graph generation unit 17 and where the left end part of the graph G1 corresponding to the start point of scanning is designated by the user through the input device 21, the display image selection unit 19 may display an ultrasound image U1 corresponding to the start point of scanning on the monitor 15 from the image memory 18 based on input information provided by the user. In addition, while illustration is not provided, in a case where the right end part of the graph G1 corresponding to the end point of scanning is designated by the user through the input device 21, the display image selection unit 19 may display the ultrasound image corresponding to the end point of scanning on the monitor 15 from the image memory 18 based on the input information provided by the user.

While the processor 22 including the image generation unit 13, the display control unit 14, the scanning detection unit 16, the graph generation unit 17, the display image selection unit 19, and the apparatus control unit 20 is composed of a central processing unit (CPU) and of a control program causing the CPU to perform various types of processing, the processor 22 may be configured using a field programmable gate array (FPGA), a digital signal processor (DSP), an application specific integrated circuit (ASIC), a graphics processing unit (GPU), or other integrated circuits (IC) or may be composed of a combination thereof.

In addition, all or a part of the image generation unit 13, the display control unit 14, the scanning detection unit 16, the graph generation unit 17, the display image selection unit 19, and the apparatus control unit 20 of the processor 22 can be configured to be integrated into one CPU or the like.

Next, operation of the ultrasound diagnostic apparatus 1 according to the embodiment of the present invention will be described using the flowchart illustrated in FIG. 8. Here, for example, the operation of the ultrasound diagnostic apparatus 1 in a case where the user scans the breast of the subject using the ultrasound probe 2 and where the height position of the ultrasound probe 2 is detected by the sensor 4 will be described.

First, the user positions the ultrasound probe 2 near one end part of the breast of the subject and starts moving the ultrasound probe 2 toward the other end part of the breast of the subject in one direction in a front view of the subject. In this state, the ultrasound image U1 is captured in step S1. In capturing the ultrasound image U1, the transmission and reception circuit 12 generates the sound ray signal by performing the so-called reception focus processing under control of the apparatus control unit 20. The sound ray signal generated by the transmission and reception circuit 12 is transmitted to the image generation unit 13. The image generation unit 13 generates the ultrasound image U1 using the sound ray signal transmitted from the transmission and reception circuit 12. The ultrasound image U1 generated in such a manner is transmitted to the display control unit 14 to be displayed on the monitor 15.

Next, in step S2, the height position of the ultrasound probe 2 is detected by the sensor 4.

Next, in step S3, the scanning detection unit 16 determines whether or not scanning has started by performing processing of detecting the start point of scanning of the breast of the subject along one direction based on a change in time of the height position of the ultrasound probe 2 detected in step S2.

In a case where scanning of the breast of the subject with the ultrasound probe 2 starts, normally, it is general to start moving the ultrasound probe 2 from a standstill state or to start moving the ultrasound probe 2 that has been moving in a constant direction to a different direction. Thus, for example, the scanning detection unit 16 can detect the start point of scanning with the ultrasound probe 2 based on a change in the detection value obtained by the sensor 4 after an elapse of a constant time from immediately before the start of scanning, such that the scanning detection unit 16 detects the imaging position immediately after a rapid change in the output value of the sensor 4 as the start point of scanning.

Here, the height position is detected only once in step S2. Thus, the scanning detection unit 16 cannot detect the start point of scanning in step S3 and determines that scanning has not started. In this case, a return is made to step S1 to newly generate the ultrasound image. Thus, processing of step S1 to step S3 is repeated until the scanning detection unit 16 detects the start of scanning of the breast of the subject after an elapse of a constant time required for detecting the start point of scanning via the scanning detection unit 16 in step S3.

In a case where the start of scanning is detected in step S3, a transition is made to step S4.

In step S4, the ultrasound image corresponding to the imaging position detected as the start point of scanning in step S3 is stored in the image memory 18.

Next, in step S5, an ultrasound image is generated in the same manner as step S1.

In step S6, the height position of the ultrasound probe 2 is detected in the same manner as step S2.

In step S7, the scanning detection unit 16 determines whether or not scanning has ended by performing processing of detecting the end point of scanning of the breast of the subject along one direction based on a change in time of the height position of the ultrasound probe 2 detected in step S6.

In a case where scanning of the breast of the subject with the ultrasound probe 2 ends, normally, it is general to bring the ultrasound probe 2 to a standstill from a moving state or to start moving the ultrasound probe 2 that has been moving in a constant direction to a different direction. Thus, the scanning detection unit 16 can detect the end point of scanning with the ultrasound probe 2 based on a change in the detection value obtained by the sensor 4 within a constant time from before the end of scanning to immediately after the end of scanning, such that the scanning detection unit 16 detects the imaging position immediately before a rapid change in the output value of the sensor 4 as the end point.

Here, the height position is detected only once in step S6. Thus, the scanning detection unit 16 cannot detect the end point of scanning in step S7 and determines that scanning has not ended. In this case, a return is made to step S5 to newly generate the ultrasound image. Thus, processing of step S5 to step S7 is repeated until the scanning detection unit 16 detects the end point of scanning of the breast of the subject after an elapse of a constant time required for detecting the end point of scanning via the scanning detection unit 16 in step S3.

In a case where the end point of scanning of the breast of the subject is detected in step S7, a transition is made to step S8.

In step S8, the ultrasound image corresponding to the imaging position detected as the end point of scanning in step S7 is stored in the image memory 18.

Next, in step S9, for example, as illustrated in FIG. 5, the graph generation unit 17 generates the graph G1 representing a change in time of the height position of the ultrasound probe 2 detected in step S6 from the start point of scanning detected in step S3 to the end point of scanning detected in step S7.

Last, in step S10, for example, as illustrated in FIG. 7, the graph generation unit 17 displays the graph G1 generated in step S9 on the monitor 15. In addition, in this state, in a case where the left end part of the graph G1 corresponding to the start point of scanning is designated by the user through the input device 21, the display image selection unit 19 displays the ultrasound image U1 corresponding to the start point of scanning on the monitor 15. In addition, while illustration is not provided, in a case where the right end part of the graph G1 corresponding to the end point of scanning is designated by the user through the input device 21, the display image selection unit 19 displays the ultrasound image corresponding to the end point of scanning on the monitor 15.

Since the graph G1 is displayed on the monitor 15 in such a manner, the user can check whether or not the breast of the subject as a target to be examined is sufficiently scanned with reference to a shape of the graph. In addition, the user can more clearly check whether or not the breast of the subject as a target to be examined is sufficiently scanned with reference to the ultrasound image U1 corresponding to the start point of scanning and to the ultrasound image corresponding to the end point of scanning.

Figure 8:
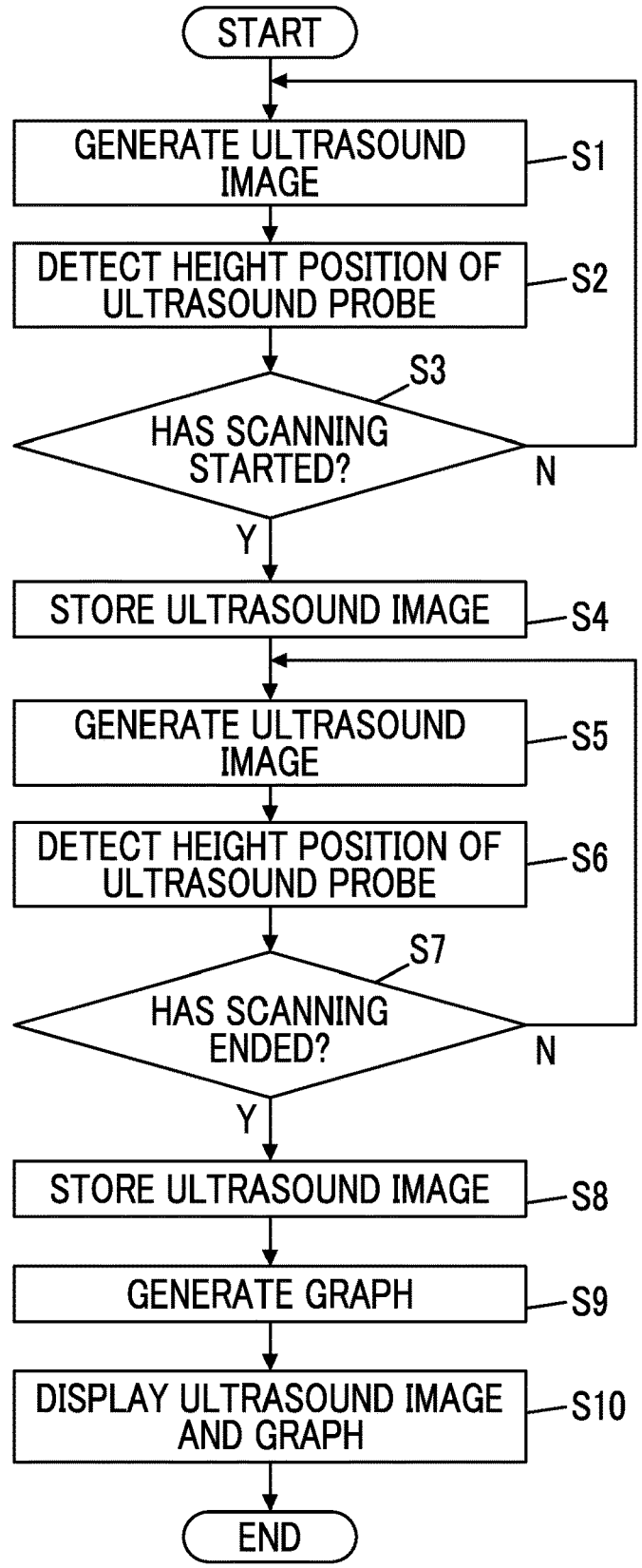
FIG. 8 is a flowchart illustrating operation of the ultrasound diagnostic apparatus according to Embodiment 1 of the present invention.

This ends the operation of the ultrasound diagnostic apparatus 1 of Embodiment 1 according to the flowchart of FIG. 8.

As described above, according to the ultrasound diagnostic apparatus 1 according to Embodiment 1, the start point and the end point of scanning with the ultrasound probe 2 are detected by the scanning detection unit 16 based on the height position or the inclined angle of the ultrasound probe 2 detected by the sensor 4. In addition, the graph G1 representing a change in time of the height position or the inclined angle of the ultrasound probe 2 detected from the start point to the end point of scanning is displayed on the monitor 15. Furthermore, the ultrasound image U1 corresponding to the start point of scanning and the ultrasound image corresponding to the end point of scanning are displayed on the monitor 15. Thus, the user can be prevented from overlooking the scanning range by clearly checking whether or not the breast of the subject as a target to be examined is sufficiently scanned and can sufficiently scan the breast of the subject.

While the height position of the ultrasound probe 2 is detected in step S2 after the ultrasound image is generated in step S1 in the flowchart illustrated in FIG. 8, processing of step S1 may be performed after processing of step S2 is performed, or processing of step S1 and processing of step S2 may be performed at the same time. In addition, while the height position of the ultrasound probe 2 is detected in step S6 after the ultrasound image is generated in step S5, processing of step S5 may be performed after processing of step S6 is performed, or processing of step S5 and processing of step S6 may be performed at the same time.

In addition, the ultrasound probe 2 and the apparatus body 3 can be connected via so-called wired communication or can be connected via so-called wireless communication.

In addition, while the sensor 4 is attached outside the ultrasound probe 2, the sensor 4 may be incorporated in the ultrasound probe 2.

In addition, the sensor 4 may not be attached to the ultrasound probe 2 as long as the height position or the inclined angle of the ultrasound probe 2 can be detected. For example, the sensor 4 can be attached to a hand of the subject holding the ultrasound probe 2. Even in this case, a relative value of the height position or a relative value of the inclined angle of the ultrasound probe 2 can be detected. Thus, in the same manner as a case where the sensor 4 is directly attached to the ultrasound probe 2, the start point and the end point of scanning may be detected by the scanning detection unit 16, and the graph G1 representing a change in time of the height position or the inclined angle of the ultrasound probe 2 may be generated by the graph generation unit 17.

Figure 9:
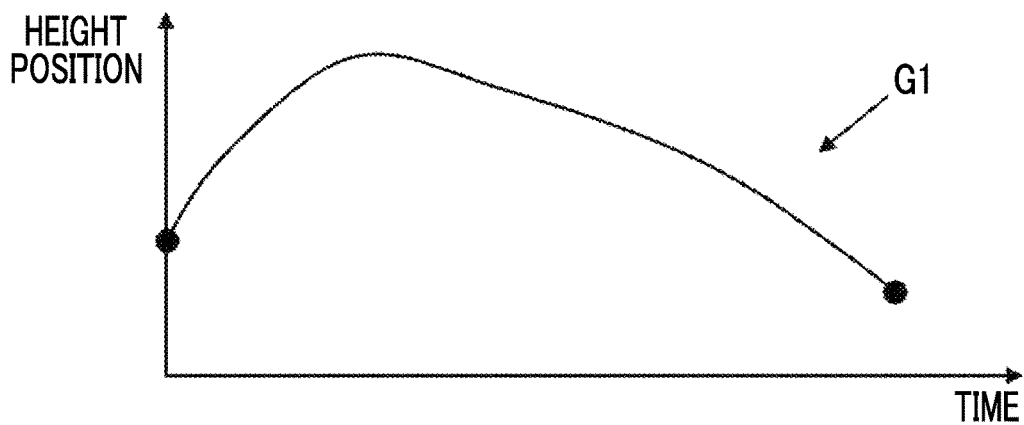
FIG. 9 is a diagram illustrating an example in which points on the graph are displayed in a highlighted manner in Embodiment 1 of the present invention.

In addition, for example, as illustrated in FIG. 9, the graph generation unit 17 can display a point corresponding to the start point of scanning and a point corresponding to the end point of scanning of the breast of the subject in the graph G1 on the monitor 15 in a highlighted manner. Accordingly, the user can easily perceive the point on the graph G1 corresponding to the start point of scanning of the breast of the subject and the point on the graph G1 corresponding to the end point of scanning of the breast of the subject and easily designate the points.

In addition, while the ultrasound image U1 corresponding to the start point of scanning and the ultrasound image corresponding to the end point of scanning detected by the scanning detection unit 16 have been described as being stored in the image memory 18, an ultrasound image corresponding to an arbitrary imaging position between the start point and the end point of scanning detected by the scanning detection unit 16 may be further stored in the image memory 18.

For example, in addition to the ultrasound image U1 corresponding to the start point of scanning and the ultrasound image corresponding to the end point of scanning detected by the scanning detection unit 16, ultrasound images having a determined number of frames generated from the start point to the end point of scanning detected by the scanning detection unit 16 may be stored in the image memory 18.

In this case, for example, in a case where points corresponding to the ultrasound images having the determined number of frames on the graph G1 displayed on the monitor 15 are designated by the user through the input device 21, the display image selection unit 19 can display the corresponding ultrasound images on the monitor 15. Accordingly, the user can more clearly check whether or not the breast of the subject is sufficiently scanned.

Figure 10:
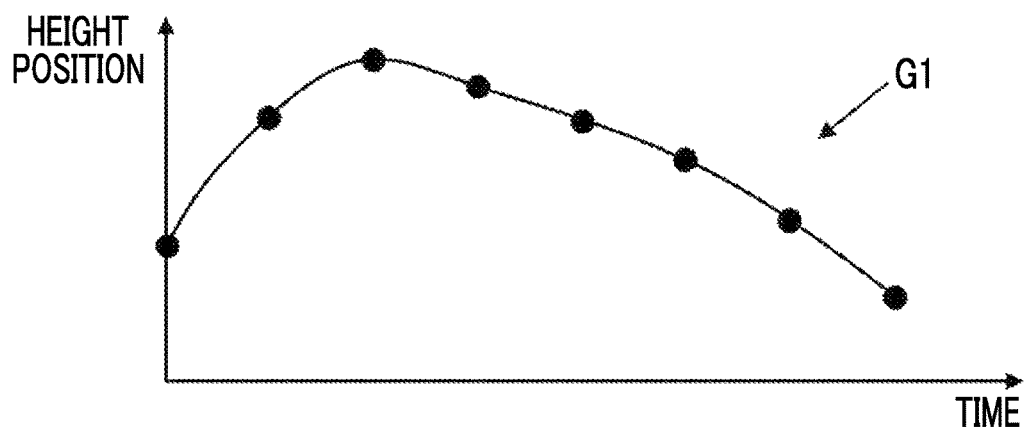
FIG. 10 is a diagram illustrating another example in which points on the graph are displayed in a highlighted manner in Embodiment 1 of the present invention.

In addition, in this case, for example, as illustrated in FIG. 10, the graph generation unit 17 can display the points corresponding to the ultrasound images having the determined number of frames stored in the image memory 18 on the graph G1 in a highlighted manner. Accordingly, the user can easily perceive which point is to be designated through the input device 21 in order to check the ultrasound image.

In addition, for example, all ultrasound images generated from the start point to the end point of scanning detected by the scanning detection unit 16 may be stored in the image memory 18. In this case, in a case where an arbitrary point on the graph G1 displayed on the monitor 15 is designated by the user through the input device 21, the display image selection unit 19 can display the ultrasound image obtained at the imaging position corresponding to the designation point on the monitor 15.

Figure 11:
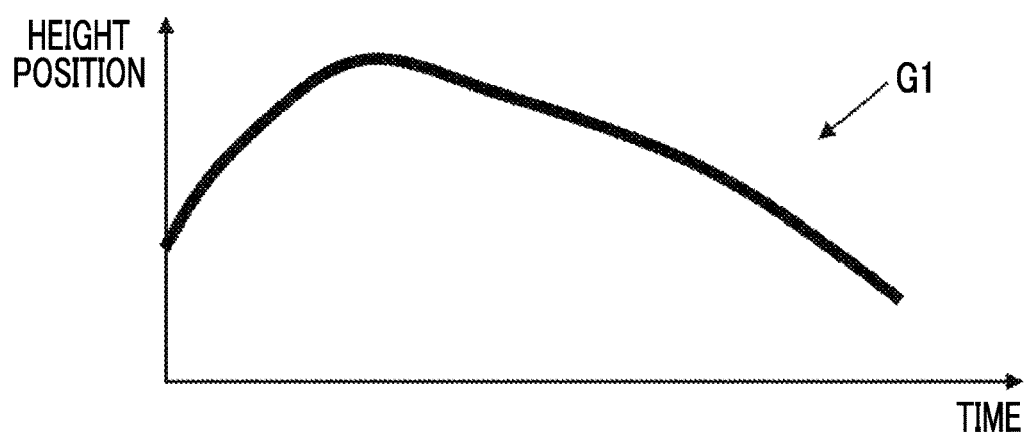
FIG. 11 is a diagram illustrating still another example in which points on the graph are displayed in a highlighted manner in Embodiment 1 of the present invention.

In addition, in this case, for example, as illustrated in FIG. 11, the graph generation unit 17 can display the points corresponding to the ultrasound images of all frames stored in the image memory 18 on the graph G1 in a highlighted manner.

In addition, while displaying the ultrasound image corresponding to the designation point designated by the user on the monitor 15 for the first time in a case where the user designates the designation point on the graph G1 in a state where the graph G1 is displayed on the monitor 15 has been described, any ultrasound image stored in the image memory 18 may be displayed on the monitor 15 together with the graph G1 even in a state where the designation point is not designated by the user. For example, after the end point of scanning of the breast of the subject is detected by the scanning detection unit 16, the ultrasound image U1 corresponding to the start point of scanning and the graph G1 may be automatically displayed on the monitor 15.

In this case, for example, in a case where ultrasound images having a plurality of frames generated between the start point and the end point of scanning are stored in the image memory 18, the user performing so-called scrolling and selection of the designation point on the graph G1 from the designation point corresponding to the start point of scanning to the designation point corresponding to the end point of scanning displays the ultrasound image having the plurality of frames on the monitor 15 such that the ultrasound images sequentially change from the ultrasound image U1 corresponding to the start point to the ultrasound image corresponding to the end point.

In addition, in a case where the ultrasound images having the plurality of frames generated between the start point and the end point of scanning are stored in the image memory 18 in addition to the ultrasound image U1 corresponding to the start point of scanning and to the ultrasound image corresponding to the end point of scanning, the ultrasound images having the plurality of frames may be continuously reproduced on the monitor 15 as a video instead of still images.

For example, in a case where the right end part of the graph G1 displayed on the monitor 15 is designated by the user through the input device 21, the ultrasound images having the plurality of frames are continuously displayed on the monitor 15 as a video in a reverse order from the ultrasound image corresponding to the end point of scanning to the ultrasound image corresponding to the start point of scanning. In addition, for example, in a case where the left end part of the graph G1 displayed on the monitor 15 is designated by the user through the input device 21, the ultrasound images having the plurality of frames are continuously displayed on the monitor 15 as a video from the ultrasound image corresponding to the start point of scanning to the ultrasound image corresponding to the end point of scanning.

In addition, for example, in a case where an arbitrary designation point present between a point corresponding to the start point of scanning and a point corresponding to the end point of scanning on the graph G1 is designated by the user through the input device 21, ultrasound images having a plurality of frames generated based on the reception signals obtained at a plurality of imaging positions corresponding to a determined range including the designation point on the graph G1 may be reproduced as a video.

The determined range corresponding to the ultrasound images having the plurality of frames on the graph G1 may be set by the user through the input device 21. For example, the determined range on the graph G1 may be set as an initial setting in a case where the ultrasound diagnostic apparatus 1 is used for the first time, and then, the initial setting may be maintained.

In addition, whether to reproduce the ultrasound images having the plurality of frames as a video in accordance with an elapse of time or to reproduce the ultrasound images having the plurality of frames as a video in a reverse order of time may be set by the user through the input device 21. For example, this setting may also be set as an initial setting in a case where the ultrasound diagnostic apparatus 1 is used for the first time, and then, the initial setting may be maintained.

In addition, while the scanning pattern for scanning from one end part to the other end part of the breast of the subject has been illustrated, the scanning pattern applied to the present invention is not particularly limited thereto. For example, an arbitrary scanning pattern, such as a scanning pattern for scanning from the nipple to the peripheral part of the breast of the subject, determined by a facility such as a hospital in which examination is performed or by the user such as a doctor can be applied to the present invention.

In addition, the operation of the ultrasound diagnostic apparatus 1 according to the flowchart of FIG. 8 has ended in a case where the graph G1 representing a change in time of the height position detected by the sensor 4 between the start point and the end point of scanning of the breast of the subject with the ultrasound probe 2 along one direction is obtained and where the ultrasound image U1 corresponding to the start point of scanning, the ultrasound image corresponding to the end point of scanning, and the graph G1 are displayed on the monitor 15 in step S10. In a case where the user examines all of the breasts of the subject, a plurality of scanning ranges are scanned, and processing of step S1 to step S10 is performed at each scanning.

In a case where scanning is performed a plurality of times in such a manner, the display of the scanning number-of-times display panel P1 illustrated in FIG. 7 is updated by the graph generation unit 17. For example, in a case where the number of times of scanning is one, the scanning number-of-times display panel P1 has only an item corresponding to scanning performed for the first time. In a case where the number of times of scanning reaches two, an item corresponding to scanning performed for the second time is added in addition to the item corresponding to scanning performed for the first time. Thus, the user can select an item corresponding to a desired number of times that scanning has already been performed from the scanning number-of-times display panel P1 and check a graph generated in scanning corresponding to the selected item on the monitor 15.

Accordingly, the user can detect all of the breasts of the subject without missing.

Embodiment 2

While the user determines whether or not scanning is sufficiently performed in accordance with the determined scanning pattern for the breast of the subject by checking the graph G1 generated by the graph generation unit 17 and the ultrasound image U1 in Embodiment 1, the ultrasound diagnostic apparatus 1 can assist the determination of the user by determining whether or not scanning is sufficiently performed in accordance with the determined scanning pattern for the breast of the subject.

Figure 12:
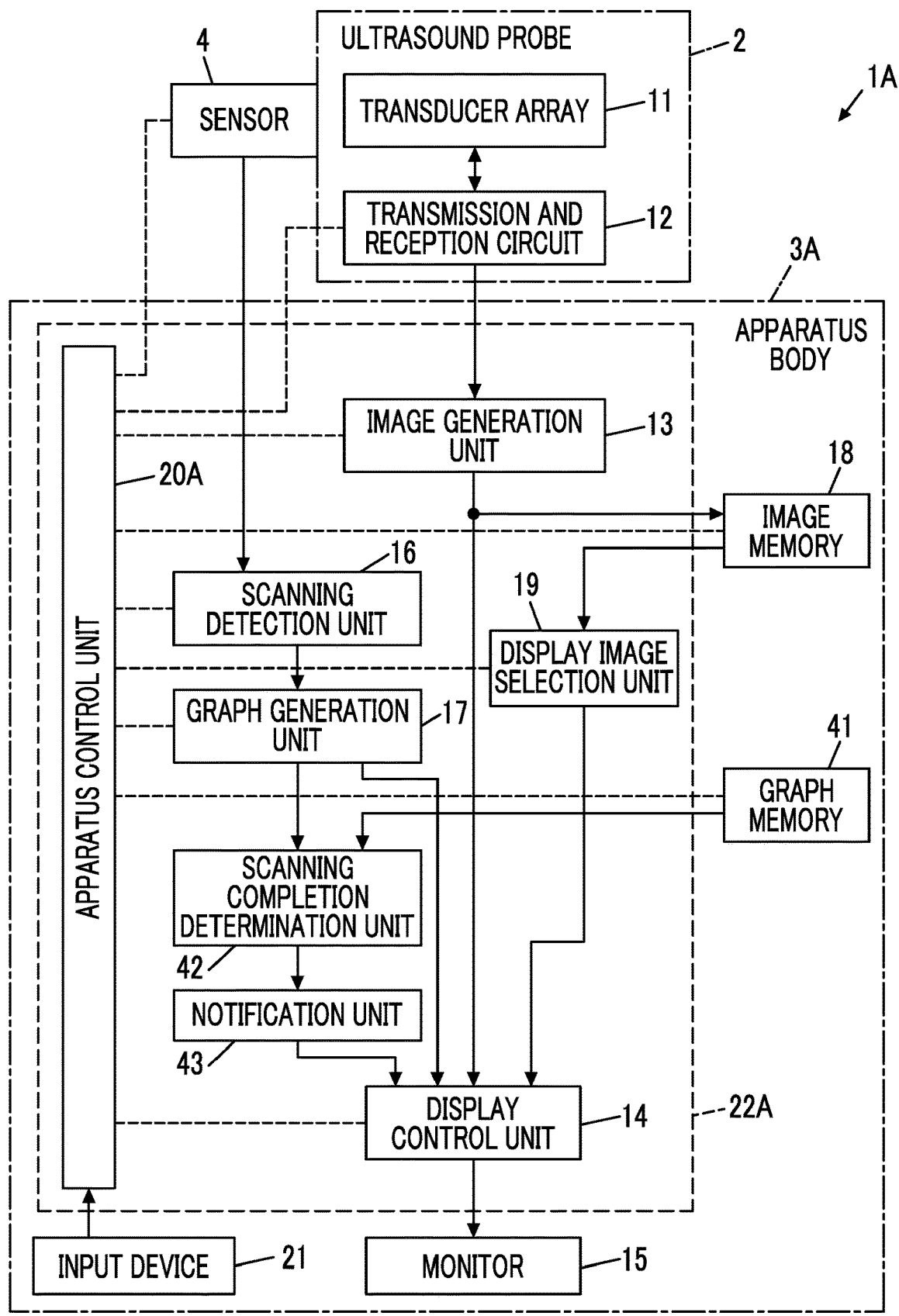
FIG. 12 is a block diagram illustrating a configuration of an ultrasound diagnostic apparatus according to Embodiment 2 of the present invention.

FIG. 12 illustrates a configuration of an ultrasound diagnostic apparatus 1A according to Embodiment 2. The ultrasound diagnostic apparatus 1A comprises an apparatus body 3A instead of the apparatus body 3 in the ultrasound diagnostic apparatus 1 of Embodiment 1 illustrated in FIG. 1. The apparatus body 3A includes a graph memory 41, a scanning completion determination unit 42, and a notification unit 43 added to the apparatus body 3 in Embodiment 1, comprises an apparatus control unit 20A instead of the apparatus control unit 20, and comprises a processor 22A instead of the processor 22.

In the ultrasound diagnostic apparatus 1A, the scanning completion determination unit 42 is connected to the graph memory 41. In addition, the display control unit 14 and the scanning completion determination unit 42 are connected to the graph generation unit 17. In addition, the notification unit 43 is connected to the scanning completion determination unit 42, and the display control unit 14 is connected to the notification unit 43.

In addition, the processor 22A is composed of the image generation unit 13, the display control unit 14, the scanning detection unit 16, the graph generation unit 17, the apparatus control unit 20A, the scanning completion determination unit 42, and the notification unit 43.

The graph memory 41 is a memory storing a graph template that is a graph representing a typical change in the height position or the inclined angle of the ultrasound probe 2 moved in accordance with the determined scanning pattern for the breast of the subject. The graph memory 41 can store graph templates related to the height position of the ultrasound probe 2 corresponding to a plurality of determined scanning patterns and can store graph templates related to the inclined angle of the ultrasound probe 2 corresponding to the plurality of determined scanning patterns.

For example, recording media such as a flash memory, an HDD, an SSD, an FD, an MO disc, an MT, a RAM, a CD, a DVD, an SD card, and a USB memory can be used as the graph memory 41.

The scanning completion determination unit 42 determines whether scanning of the breast of the subject with the ultrasound probe 2 complying with the determined scanning pattern is completed or not completed based on the shape of the graph generated by the graph generation unit 17.

For example, the scanning completion determination unit 42 compares the graph G1 generated by the graph generation unit 17 with the graph template stored in the graph memory 41 and, in a case where the shape of the graph G1 is recognized as being almost identical to a shape of the graph template, determines that scanning of the breast of the subject complying with the determined scanning pattern is completed.

Figure 13:
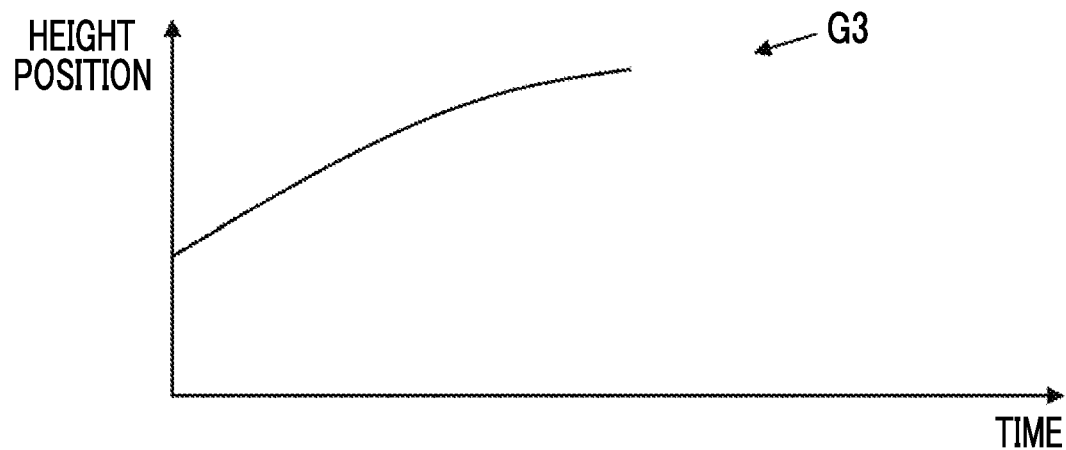
FIG. 13 is an example of a graph showing a change in time of a height position of an ultrasound probe detected in Embodiment 2 of the present invention.

In addition, in a case where the shape of the graph G1 is recognized as being different from the shape of the graph template, the scanning completion determination unit 42 determines that scanning of the breast of the subject complying with the determined scanning pattern is not completed. For example, in a case where the determined scanning pattern is a scanning pattern from one end part to the other end part of the breast of the subject along one direction and where the graph generated by the graph generation unit 17 is, as illustrated in FIG. 13, a graph G3 representing a change in the height position of the ultrasound probe 2 complying with the scanning pattern from one end part to near the nipple of the breast of the subject along one direction, the scanning completion determination unit 42 recognizes that a shape of the graph G3 is different from the shape of the graph template, and determines that scanning complying with the determined scanning pattern is not completed.

Figure 14:
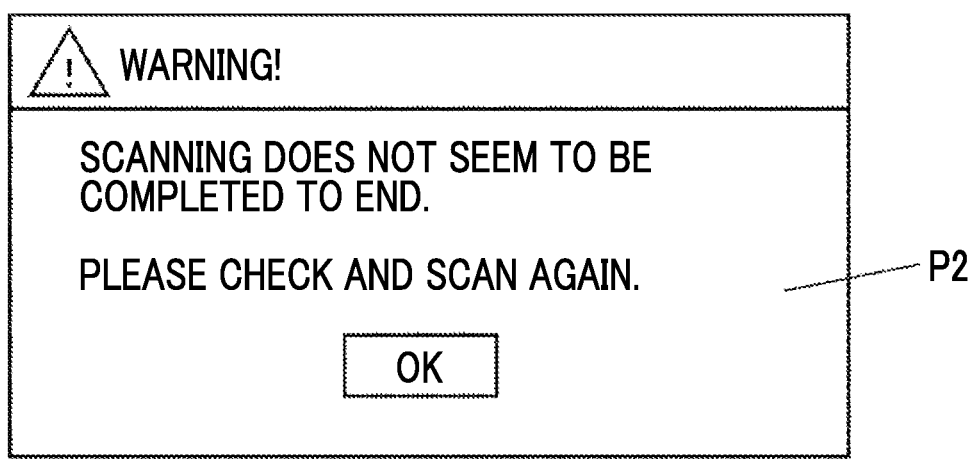
FIG. 14 is a diagram illustrating an example of a notification message displayed on a monitor in Embodiment 2 of the present invention.

The notification unit 43 notifies the user in a case where the scanning completion determination unit 42 determines that scanning with the ultrasound probe 2 is not completed. For example, as illustrated in FIG. 14, the notification unit 43 can display, on the monitor 15, a notification panel P2 showing a message "Scanning does not seem to be completed to end. Please check and scan again." indicating that scanning with the ultrasound probe 2 is not completed. The user checks the message of the notification panel P2 and performs scanning complying with the determined scanning pattern again.

As described above, according to the ultrasound diagnostic apparatus 1A according to Embodiment 2, the scanning completion determination unit 42 determines whether or not scanning of the breast of the subject complying with the determined scanning pattern is completed based on the shape of the graph generated by the graph generation unit 17, and the notification unit 43 notifies the user in a case where it is determined that scanning is not completed. Thus, the user can be prevented from overlooking the scanning range by easily determining whether or not the breast of the subject is sufficiently scanned and can sufficiently scan the breast of the subject.

The determined scanning pattern may be designated by the user through the input device 21 before examination of the part of the subject. In this case, the scanning completion determination unit 42 can read out a graph template corresponding to the determined scanning pattern designated by the user from a plurality of graph templates stored in the graph memory 41 and determine whether or not scanning complying with the determined scanning pattern is completed by comparing the read graph template with the graph G1 generated by the graph generation unit 17.

In addition, a plurality of graph templates corresponding to types of the sensor 4 such as an acceleration sensor and a gyro sensor, that is a plurality of graph templates corresponding to types of graphs such as the height position and the inclined angle of the ultrasound probe 2, can be stored in the graph memory 41. In addition, the apparatus control unit 20A can automatically recognize the type of the connected sensor 4 in a case where the sensor 4 is connected to the apparatus body 3A. In this case, the scanning completion determination unit 42 can read out the graph template from the graph memory 41 by considering the type of sensor recognized by the apparatus control unit 20A and use the read graph template for determining whether or not scanning complying with the determined scanning pattern is completed.

Embodiment 3

Scanning may be interrupted for some reason during scanning of the breast of the subject complying with the determined scanning pattern by the user. In this case, scanning performed before and after the interruption may be combined into one to prevent erroneous detection of the end point of scanning.

Figure 15:
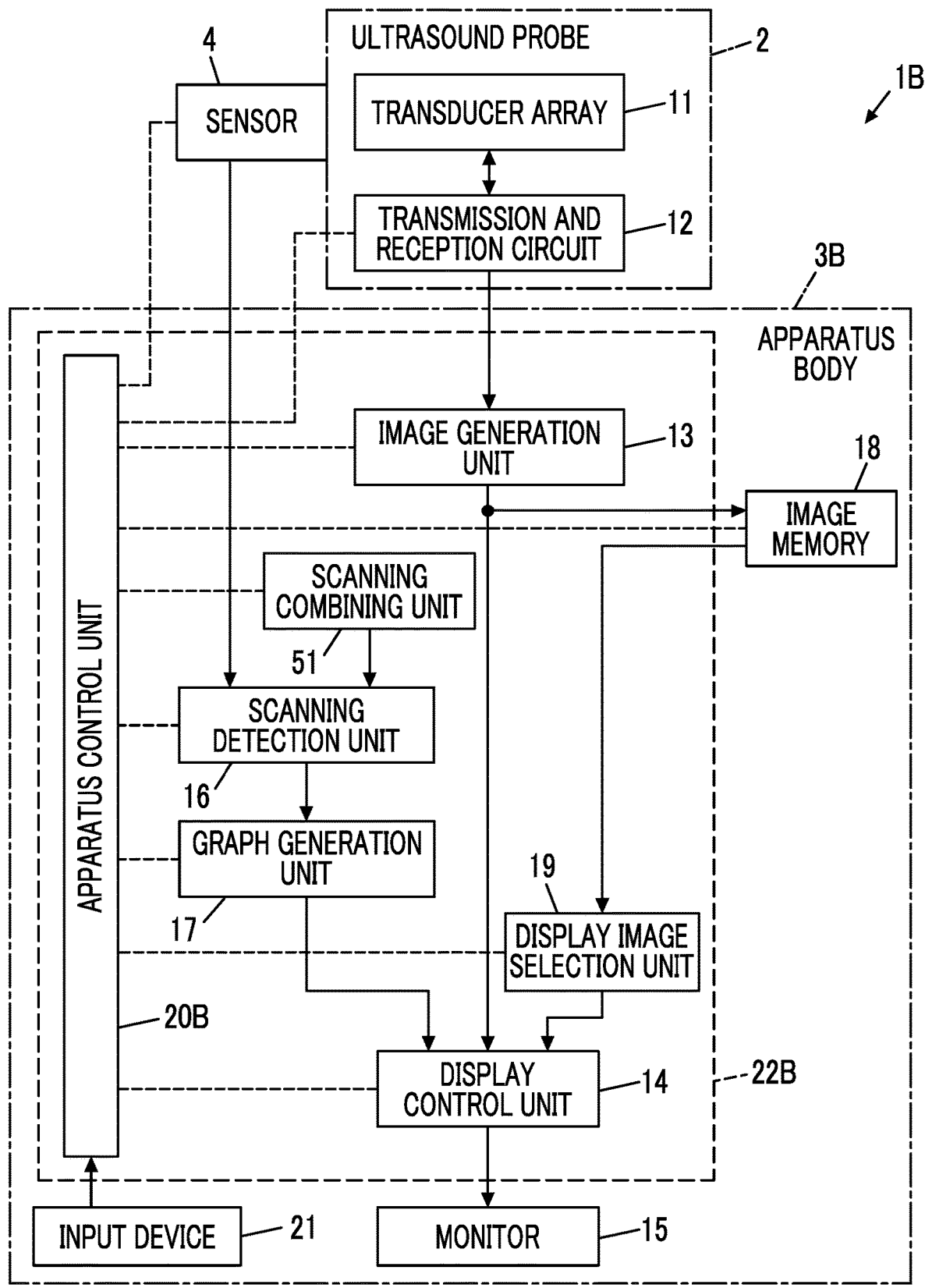
FIG. 15 is a block diagram illustrating a configuration of an ultrasound diagnostic apparatus according to Embodiment 3 of the present invention.

FIG. 15 illustrates a configuration of an ultrasound diagnostic apparatus 1B according to Embodiment 3. The ultrasound diagnostic apparatus 1B of Embodiment 3 comprises an apparatus body 3B instead of the apparatus body 3 in the ultrasound diagnostic apparatus 1 of Embodiment 1 illustrated in FIG. 1. In addition, the apparatus body 3B includes a scanning combining unit 51 added to the apparatus body 3 in Embodiment 1, comprises an apparatus control unit 20B instead of the apparatus control unit 20, and comprises a processor 22B instead of the processor 22.

In the apparatus body 3B, the scanning combining unit 51 is connected to the scanning detection unit 16 and to the apparatus control unit 20B.

In addition, the processor 22B is composed of the image generation unit 13, the display control unit 14, the scanning detection unit 16, the graph generation unit 17, the display image selection unit 19, the apparatus control unit 20B, and the scanning combining unit 51.

In the ultrasound diagnostic apparatus 1B, scanning of the breast of the subject complying with the determined scanning pattern may be interrupted based on an instruction of the user provided through the input device 21. In addition, the interrupted scanning complying with the determined scanning pattern may be resumed based on an instruction of the user provided through the input device 21. For example, in a case where a scanning interruption button, not illustrated, is displayed on the monitor 15 and where the user selects the scanning interruption button through the input device 21, scanning complying with the determined scanning pattern is interrupted. In addition, for example, in a case where a scanning resumption button, not illustrated, is displayed on the monitor 15 and where the user selects the scanning resumption button through the input device 21, the interrupted scanning of the determined scanning range is resumed.

In a case where scanning of the breast of the subject complying with the determined scanning pattern is interrupted based on the instruction of the user provided through the input device 21 and where scanning complying with the determined scanning pattern is resumed based on the instruction of the user, the scanning combining unit 51 combines the interrupted scanning and the resumed scanning into one scanning.

For example, in a case where scanning of the breast of the subject complying with the determined scanning pattern is interrupted based on the instruction of the user, the scanning combining unit 51 causes the scanning detection unit 16 to temporarily stop the processing of detecting the end point of scanning complying with the determined scanning pattern. In addition, in a case where scanning of the breast of the subject complying with the determined scanning pattern is resumed based on the instruction of the user, the scanning combining unit 51 causes the scanning detection unit 16 to resume the processing of detecting the end point of scanning. Accordingly, the scanning detection unit 16 is prevented from erroneously detecting the end point of scanning complying with the determined scanning pattern in a case where scanning complying with the determined scanning pattern is interrupted.

As described above, according to the ultrasound diagnostic apparatus 1B of Embodiment 3, even in a case where scanning of the breast of the subject complying with the determined scanning pattern is interrupted, the interrupted scanning and the resumed scanning are combined into one scanning by the scanning combining unit 51. Thus, the scanning detection unit 16 is prevented from erroneously detecting the end point of scanning of the breast of the subject. Accordingly, the user can be prevented from overlooking the scanning range by clearly checking whether or not the breast of the subject as a target to be examined is sufficiently scanned and can sufficiently scan the breast of the subject.

While the aspect of Embodiment 3 has been described as being applicable to Embodiment 1, the same application can be made to Embodiment 2.

EXPLANATION OF REFERENCES 1, 1A, 1B: ultrasound diagnostic apparatus
2: ultrasound probe
3, 3A: apparatus body
4: sensor
11: transducer array
12: transmission and reception circuit
13: image generation unit
14: display control unit
15: monitor
16: scanning detection unit
17: graph generation unit
18: image memory
19: display image selection unit
20A, 20B: apparatus control unit
21: input device
22, 22A, 22B: processor
31: pulser
32: amplification unit
33: AD conversion unit
34: beam former
35: signal processing unit
36: DSC
37: image processing unit
41: graph memory
42: scanning completion determination unit
43: notification unit
51: scanning combining unit
B1: selection button
BS: body surface
G1, G2, G3: graph
P1: scanning number-of-times display panel
P2: notification panel
U1: ultrasound image

What is claimed is:

1. An ultrasound diagnostic apparatus comprising:
a monitor;
an ultrasound probe;
a sensor configured to detect an inclined angle or a height position of the ultrasound probe;
a processor configured to
generate a plurality of ultrasound images based on a plurality of reception signals obtained by sequentially scanning a breast of a subject using the ultrasound probe,
detect a start point and an end point of scanning of the breast of the subject with the ultrasound probe along one direction based on the inclined angle or the height position of the ultrasound probe detected by the sensor,
generate a graph representing a change in the inclined angle or the height position of the ultrasound probe detected by the sensor between the start point and the end point of scanning with the ultrasound probe which are detected,
display the graph on the monitor,
accept at least one of a point on the graph designated by a user corresponding to the start point and a point on the graph designated by the user corresponding to the end point as a first designated point, and
display, on the monitor, an ultrasound image generated at a first imaging position on the breast of the subject corresponding to the first designated point among the plurality of ultrasound images; and
a memory configured to store a graph template representing a typical change in the inclined angle or the height position of the ultrasound probe in a determined scanning pattern of the ultrasound probe,
wherein the processor is further configured to
determine whether scanning complying with the determined scanning pattern is completed or not completed by comparing the graph with the graph template, and
notify the user once it is determined that scanning with the ultrasound probe is not completed.

2. The ultrasound diagnostic apparatus according to claim 1, wherein the processor is further configured to
accept any point on the graph designated by the user different from the first designated point as a second designated point, and
display, on the monitor, an ultrasound image generated at a second imaging position on the breast of the subject corresponding to the second designated point among the plurality of ultrasound images.

3. The ultrasound diagnostic apparatus according to claim 1, wherein the processor is further configured to
accept any point on the graph designated by the user different from the first designated point as a second designated point, and
display, on the monitor, ultrasound images generated at a plurality of imaging positions corresponding to a determined range on the graph including the second designation point among the plurality of ultrasound images as a video.

4. The ultrasound diagnostic apparatus according to claim 1,
wherein the processor is further configured to display the first designated point in the graph, on the monitor in a highlighted manner.

5. The ultrasound diagnostic apparatus according to claim 1,
the processor is further configured to combine a first scanning with the ultrasound probe which is interrupted based on an instruction of the user and a second scanning with the ultrasound probe which is resumed based on an instruction of the user.

6. A control method of an ultrasound diagnostic apparatus, the method comprising:
detecting an inclined angle or a height position of an ultrasound probe via a sensor;

generating a plurality of ultrasound images based on a plurality of reception signals obtained by sequentially scanning a breast of a subject using the ultrasound probe;

detecting a start point and an end point of scanning of the breast of the subject with the ultrasound probe along one direction based on the inclined angle or the height position of the ultrasound probe detected by the sensor;

generating a graph representing a change in the inclined angle or the height position of the ultrasound probe detected between the start point and the end point of scanning with the ultrasound probe and displaying the graph on a monitor;

accepting at least one of a point on the graph designated by a user corresponding to the start point and a point on the graph designated by the user corresponding to the end point as a first designated point;

displaying, on the monitor, an ultrasound image generated at a first imaging position on the breast of the subject corresponding to the first designated point among the plurality of ultrasound images;

storing in advance a graph template representing a typical change in the inclined angle or the height position of the ultrasound probe in a determined scanning pattern of the ultrasound probe;

determining whether scanning complying with the determined scanning pattern is completed or not completed by comparing the graph with the graph template; and notifying the user once it is determined that scanning with the ultrasound probe is not completed.

7. The control method of the ultrasound diagnostic apparatus according to claim 6,
wherein any point on the graph designated by the user different from the first designated point is accepted as a second designated point, and
wherein an ultrasound image generated at a second imaging position on the breast of the subject corresponding to the second designated point among the plurality of ultrasound images is displayed on the monitor.

8. The control method of the ultrasound diagnostic apparatus according to claim 6,
wherein any point on the graph designated by the user different from the first designated point is accepted as a second designated point,
wherein ultrasound images generated at a plurality of imaging positions corresponding to a determined range on the graph including the second designation point which among the plurality of ultrasound images are displayed on the monitor as a video.

9. The control method of the ultrasound diagnostic apparatus according to claim 6,
wherein the first designated point in the graph is displayed on the monitor in a highlighted manner.

10. The control method of the ultrasound diagnostic apparatus according to claim 6,
wherein a first scanning which is interrupted by the user and a second scanning which is resumed by the user are combined into one scanning.

* * * * *